(12) United States Patent
Kimura et al.

(10) Patent No.: US 8,251,336 B2
(45) Date of Patent: Aug. 28, 2012

(54) SEAT TRACK MECHANISM FOR VEHICLE

(75) Inventors: Akihiro Kimura, Kanagawa (JP);
Hidehiko Fujioka, Kanagawa (JP);
Hiroyuki Suzuki, Kanagawa (JP); Kanji Yamaguchi, Kanagawa (JP)

(73) Assignee: Shiroki Corporation, Fujisawa-Shi (JP)

( * ) Notice: Subject to any disclaimer, the term of this patent is extended or adjusted under 35 U.S.C. 154(b) by 762 days.

(21) Appl. No.: 12/169,910

(22) Filed: Jul. 9, 2008

(65) Prior Publication Data
US 2010/0006733 A1  Jan. 14, 2010

(51) Int. Cl.
*F16M 13/00* (2006.01)

(52) U.S. Cl. .......................... 248/430; 248/424; 248/429

(58) Field of Classification Search .................. 248/430, 248/429, 424
See application file for complete search history.

(56) References Cited

U.S. PATENT DOCUMENTS

| | | | | |
|---|---|---|---|---|
| 5,348,262 | A * | 9/1994 | Isomura | 248/430 |
| 5,447,352 | A * | 9/1995 | Ito et al. | 296/65.14 |
| 5,516,071 | A * | 5/1996 | Miyauchi | 248/429 |
| 5,529,397 | A * | 6/1996 | Yoshida | 384/47 |
| 5,785,291 | A * | 7/1998 | Chang | 248/429 |
| 5,961,089 | A * | 10/1999 | Soisnard | 248/430 |
| 6,089,521 | A * | 7/2000 | Tarusawa et al. | 248/430 |
| 6,676,099 | B2 * | 1/2004 | Mallard et al. | 248/429 |
| 6,869,057 | B2 * | 3/2005 | Matsumoto et al. | 248/430 |
| 6,874,746 | B2 * | 4/2005 | Ganot | 248/430 |
| 7,267,317 | B2 * | 9/2007 | Kato et al. | 248/429 |
| 7,669,826 | B2 * | 3/2010 | Hayakawa et al. | 248/430 |
| 7,758,008 | B2 * | 7/2010 | Kojima et al. | 248/430 |
| 7,931,246 | B2 * | 4/2011 | Brewer et al. | 248/429 |
| 2005/0017551 | A1 * | 1/2005 | Kato et al. | 297/65 |

FOREIGN PATENT DOCUMENTS

WO  WO 2006/053145 A1 *  5/2006
* cited by examiner

*Primary Examiner* — Anita M King
(74) *Attorney, Agent, or Firm* — Millen, White, Zelano, Branigan, P.C.

(57) ABSTRACT

A seat track mechanism for a vehicle, includes a lower rail mounted to a vehicle floor; an upper rail supported by the lower rail and slidable relative to the lower rail; and spherical rotators held between the lower and upper rails, the spherical rotators rolling via a sliding movement of the upper rail. One of the upper rail and the lower rail includes at least one horizontal flat portion parallel to a widthwise direction of the seat track mechanism and parallel to a direction of the sliding movement of the upper rail, and the other of the upper rail and the lower rail includes at least one rotator supporting recess having a circularly arcuate shape in cross section which is uniform in a lengthwise direction of the seat track mechanism, the spherical rotators being held between the rotator supporting recess and the horizontal flat portion.

16 Claims, 11 Drawing Sheets

Prior Art

SEAT TRACK MECHANISM FOR VEHICLE

BACKGROUND OF THE INVENTION

1. Field of the Invention

The present invention relates to a seat track mechanism for a vehicle such as an automobile. The seat track mechanism supports a vehicle seat and allows the vehicle seat to be moved forward and rearward for adjustment.

2. Description of the Related Art

A conventional seat track mechanism in which spherical rotators (balls) are installed between a pair of lower rails (lower tracks) and a pair of upper rails (upper tracks) to smooth the sliding movement of the upper rails relative to the lower rails is known in the art. This type of seat track mechanism is disclosed in Japanese unexamined patent publication No. 2005-47347.

FIG. 16 shows a cross sectional view of a conventional seat track mechanism by way of example, taken along a vertical plane orthogonal to the sliding direction of an upper rail (upper track). A lower rail 40 that is fixed to a vehicle floor (floor surface) is in the shape of a hollow box, the top of which is open. The lower rail 40 includes a bottom portion 40a, a pair of (left/right) side wall portions 40b, a pair of inward-extending flanges 40c and a pair of downward-extending flanges 40d, wherein the pair of side wall portions 40b extend upwardly from the lateral edges of the bottom portion 40a, the pair of inward-extending flanges 40c extend inwardly from the top edges of the side wall portions 40b, and the pair of downward-extending flanges 40d extend downwardly from the inner edges of the pair of inward-extending flanges 40c. The upper rail 41 includes a top portion 41a, a pair of (left/right) vertical wall portions 41b, a pair of (left/right) first inclined portions 41c and a pair of (left/right) second inclined portions 41d, wherein the pair of vertical wall portions 41b extend downwardly from the lateral edges of the top portion 41a, the pair of first inclined portions 41c extend obliquely toward the adjacent side wall portions 40b from the bottom edges of the pair of vertical wall portions 41b, the pair of second inclined portions 41d extend obliquely upwards from the outer edges of the pair of first inclined portions 41c. Each of the pair of first inclined portions 41c is inclined upwardly in a direction from the boundary between the first inclined portion 41c and the associated vertical wall portion 41b (i.e., from the widthwise center of the upper rail 41) toward the adjacent side wall portion 40b. Each of the pair of second inclined portions 41d is inclined upwardly in a direction away from the boundary between the second inclined portion 41d and the associated first inclined portion 41c toward the widthwise center of the upper rail 41. Two pairs (left/right pairs) of balls 42 and 43 are installed between the lower rail 40 and the upper rail 41, respectively. Each ball 42 is inscribed in the boundary between the bottom portion 40a and the adjacent side wall portion 40b of the lower rail 40 and also in contact with the adjacent first inclined portion 41c of the upper rail 41. Each ball 43 is inscribed in the boundary between the adjacent side wall portion 40b and the adjacent inward-extending flanges 40c of the lower rail 40 and also in contact with the adjacent second inclined portion 41d of the upper rail 41. Accordingly, in the seat track mechanism shown in FIG. 16, the four balls 42 and 43 are installed to be inscribed in four corners of the inner surface of the box-shaped lower rail 40 to be pressed against these four corners so that the upper rail 41 is indirectly supported by the lower rail 40 via the four balls 42 and 43 at the four corners. If a moving force in the forward/rearward direction is given to the upper rail 41, the upper rail 41 moves in the forward/rearward direction relative to the lower rail 40 while rolling (rotating) the four balls 42 and 43.

In this type of seat track mechanism using balls in the manner as shown in FIG. 16, there is a problem with the working accuracies of the lower rail 40 and the upper rail 41 being apt to exert an influence on the positional accuracy and the sliding performance of the upper rail 41. Specifically, the heightwise position of the upper rail 41 with respect to the lower rail 40 is determined by the engagements of the left/right first inclined portions 41c with the two balls 42; however, if the points of contact of the pair of first inclined portions 41c relative to the balls 42 in the rail widthwise direction (left/right direction with respect to FIG. 16) vary, the heightwise position of the upper rail 41 varies because the left/right first inclined portions 41c are inclined to both the horizontal and vertical directions. In addition, since a force urging each ball 42 to be held at a balancing position relative to the associated first inclined portion 41c is produced, the upper rail 41 easily tilts when the bilaterally symmetrical shapes of the left/right first inclined portions 41c relative to the rail widthwise direction are not properly maintained or when a slanting (rotational) force along the first inclined portions 41c acts on the upper rail 41. Additionally, the downward load acting on the upper rail 41 is received by the pair of first inclined portions 41c and the balls 42; however, a component force urging the pair of vertical wall portions 41b to approach each other along the inclinations of the left/right first inclined portions 41c is produced if a downward load is imposed on the upper rail 41 from the top portion 41a when, e.g., an occupant sits in the seat on the upper rail 41. If the upper rail 41 is deformed by this component force, there is a possibility that the sliding load becomes too light or play occurs between the upper rail 41 and the lower rail 40 and between the upper rail 41 and the balls 42 and 43.

Additionally, not only a downward load but also an upward load acts on the seat track mechanism via a seatbelt anchor and the like. In the seat track mechanism shown in FIG. 16, a load in a direction to pull up the upper rail 41 is received by the balls 43 via the left/right second inclined portions 41d. Since the second inclined portions 41d are inclined to both the horizontal and vertical directions, a component force in a horizontal direction is produced due to the inclination of the left/right second inclined portions 41d if a load in the upward direction with respect to FIG. 16 acts on the upper rail 41. This component force acts on the upper rail 41 to urge the pair of vertical wall portions 41b to approach each other and also acts on the lower rail 40 to urge the pair of side wall portions 40b to move away from each other. If the positions of the upper rail 41 and the lower rail 40 change according to this component force, the force to hold the balls 42 and 43 becomes weak, so that the upper rail 41 becomes unsteady.

In a seat track mechanism for an automobile which supports a vehicle seat and allows the vehicle seat to be moved forward and rearward for adjustment, a pair of upper rails fixed to the bottom of the vehicle seat are supported by a pair of lower rails fixed to a vehicle floor to be slidable relative to the pair of lower rails, respectively. Although mainly a downward load due to the weight of the seated occupant and the weight of the vehicle seat itself acts on the pair of upper rails under normal usage conditions, an upward tensile load (pulling load) acts on a seatbelt anchor fixed to one of the pair of upper rails if the seatbelt is pulled strongly at a time of, e.g., collision of the vehicle. To prevent the upper rail, having the seatbelt anchor, from being detached from the associated lower rail to protect the seated occupant upon such an upward tensile load acting on the seatbelt anchor, the seat track mechanism is designed to have an anti-detaching structure preventing the upper rail from moving upward relative to the lower rail. A seat track mechanism with such an anti-detaching structure is known in the art in which a pair of anti-detaching flanges, such as the inward-extending flanges 40c of FIG. 16, are formed on the top side of a lower rail that has a box-shaped cross section and in which a corresponding pair of anti-detaching portions which come in contact with the pair of anti-detaching flanges of the lower rail from below are formed on the associated upper rail in a manner such as disclosed in Japanese unexamined patent publication NO. 2003-72432.

Due to the structure of a seatbelt, the pulling load that is imposed on the seatbelt anchor-bearing upper rail via the seatbelt and the seatbelt anchor acts on the seatbelt anchor-bearing upper rail in an upward direction slightly inclined to the vertical direction. In an upper rail provided in the widthwise center thereof with a portion having an inverted U-shaped cross section and further provided at the opposite ends of this central portion in the widthwise direction of the upper rail with two anti-detaching portions, respectively, i.e., in a type of upper rail having a hat-shaped (Ω-shaped) cross section such as disclosed in Japanese unexamined patent publication No. 2003-72432, there is a possibility of the upper rail being deformed in a manner to make a central portion of the upper rail become narrower (to narrow the width of the central portion of the upper rail) when the upper rail is acted upon by a pulling load in a direction obliquely upward via the anti-detaching portions. If this sort of deformation appears, the strength of the upper rail decreases or the upper rail becomes unsteady when the upper rail slides on the lower rail, and accordingly, it is necessary to take such measures as a measure to provide the aforementioned seatbelt anchor-bearing upper rail therein with a reinforcing member or the like which prevents this upper rail from being deformed.

SUMMARY OF THE INVENTION

The present invention provides a seat track mechanism in which an upper rail is supported by a lower rail to be slidable on the lower rail via spherical rotators, wherein the seat track mechanism is simple in structure, the positional deviation of the upper rail relative to the lower rail does not easily occur, and the upper rail does not easily become unsteady when the upper rail slides on the lower rail.

In addition, the present invention provides a seat track mechanism which is designed so that the strength of the upper rail and the sliding performance thereof are not easily impaired upon a pulling load (upward tensile load) in an upward direction slightly inclined to the vertical direction being imposed on the upper rail.

According to an aspect of the present invention, a seat track mechanism for a vehicle is provided, including a lower rail mounted to a vehicle floor; an upper rail supported by the lower rail to be slidable relative to the lower rail; and spherical rotators held between the lower rail and the upper rail, wherein the spherical rotators roll according to a sliding movement of the upper rail. One of the upper rail and the lower rail includes at least one horizontal flat portion substantially parallel to a widthwise direction of the seat track mechanism and substantially parallel to a direction of the sliding movement of the upper rail. The other of the upper rail and the lower rail includes at least one rotator supporting recess having a circularly arcuate shape in cross section which is uniform in a lengthwise direction of the seat track mechanism, the spherical rotators being held between the rotator supporting recess and the horizontal flat portion.

It is desirable for a radius of curvature of a circularly-arcuate inner peripheral surface of the rotator supporting recess to be greater than a radius of curvature of the spherical rotators.

It is desirable for the rotator supporting recess to be formed at a base of the lower rail, and for the horizontal flat portion to be formed on the upper rail.

It is desirable for a pair of the horizontal flat portions to be provided at different positions in a widthwise direction of the upper rail, and for a pair of the rotator supporting recesses to be provided at corresponding different positions in a widthwise direction of the lower rail.

It is desirable for each of the spherical rotators to be a metal ball.

It is desirable for the rotator supporting recess to be recessed in a direction away from the horizontal flat portion.

It is desirable for the rotator supporting recess and the horizontal flat portion to face each other in a vertical direction of the seat track mechanism.

It is desirable for the seat track mechanism to include at least one guide rod for supporting the spherical rotators which is installed between the rotator supporting recess and the horizontal flat portion, the guide rod extending parallel to both the upper rail and the lower rail, wherein the guide rod includes through holes in which the spherical rotators are engaged, respectively, so that relative positions between the spherical rotators in the direction of the sliding movement of the upper rail are maintained constant.

According to another aspect of the present invention, the upper rail includes a central portion having an inverted U-shaped cross section, and two anti-detaching portions which are formed on opposite sides of the central portion in a widthwise direction thereof to prevent the upper rail from being detached from the lower rail. The two anti-detaching portions apply a component force on the central portion so as to urge the central portion to increase a width thereof by abutting against two flanges formed on the lower rail, respectively, when a pulling load in a direction obliquely upward and lateral is imposed on the upper rail.

It is desirable for each the two anti-detaching portions to produce a component force urging a free end thereof that abuts against associated one of the two flanges to tilt toward a widthwise center of the upper rail about an axis substantially parallel to a lengthwise direction of the upper rail when the pulling load is imposed on the upper rail.

It is desirable for the free end of each anti-detaching portion of the upper rail to be positioned closer to the central portion of the upper rail than the axis, and for an angle of a line connecting the free end of each anti-detaching portion with the axis relative to a vertical direction to be greater than an angle of the direction of the pulling load.

It is desirable for the lower rail to include two deformation preventive portions which are positioned adjacent to the opposite sides of the central portion of the upper rail to prevent the width of the central portion of the upper rail from increasing.

It is desirable for the two anti-detaching portions of the upper rail to be provided as a pair which are respectively positioned on opposite sides of the central portion of the upper rail in the widthwise direction thereof to be substantially bisymmetrical to each other.

It is desirable for the central portion and the two anti-detaching portions of the upper rail to be formed to have an Ω-shaped cross section taken along a plane orthogonal to a direction of sliding movement of the upper rail relative to the lower rail.

According to an aspect of the present invention, a seat track mechanism can be achieved in which a simple structure improves the accuracy and the strength of a rotator supporting structure of the seat track mechanism, effectively prevents the positional deviation of the upper rail relative to the lower rail from occurring, and effectively prevents the upper rail from becoming unsteady when the upper rail slides on the lower rail.

According to an aspect of the present invention, a seat track mechanism can be achieved in which the strength of the upper rail and the sliding performance thereof are not easily impaired upon a pulling load (upward tensile load) in an upward direction slightly inclined to the vertical direction being imposed on the upper rail.

BRIEF DESCRIPTION OF THE DRAWINGS

The present invention will be described below in detail with reference to the accompanying drawings in which.

DESCRIPTION OF THE PREFERRED EMBODIMENTS

Figure 1:
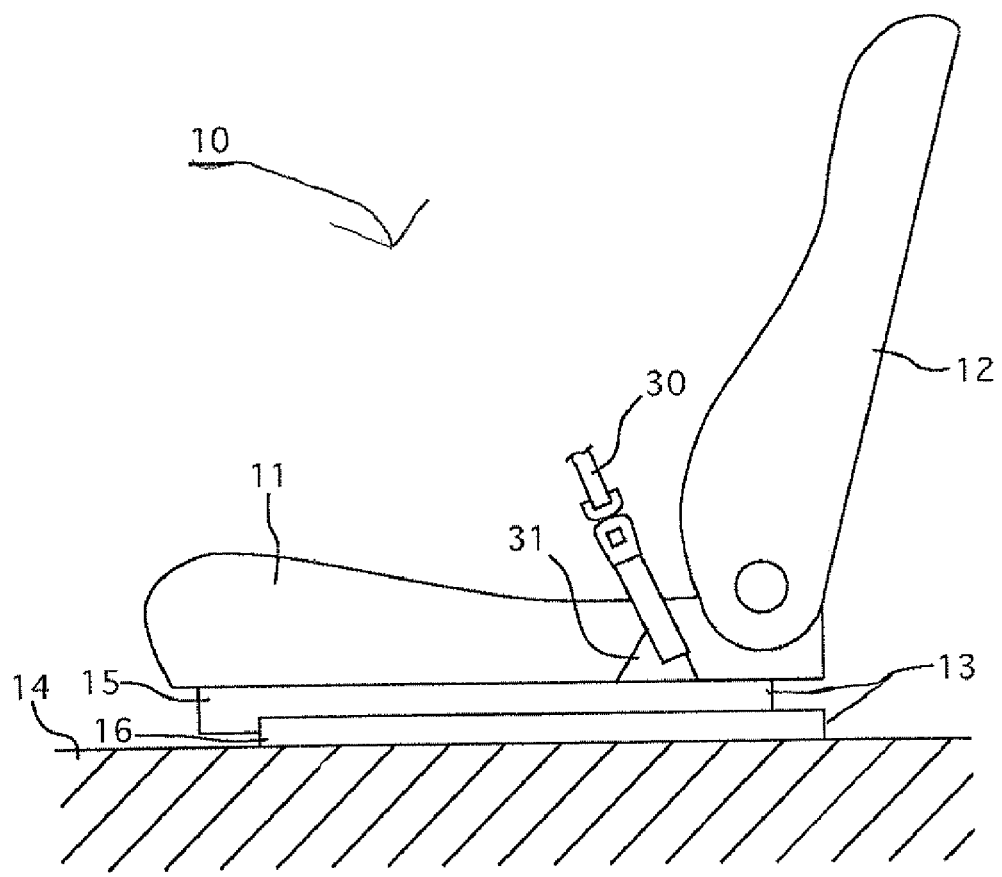
FIG. 1 is a side elevational view of a vehicle seat assembly including a first embodiment of a seat track mechanism according to the present invention.
Figure 2:
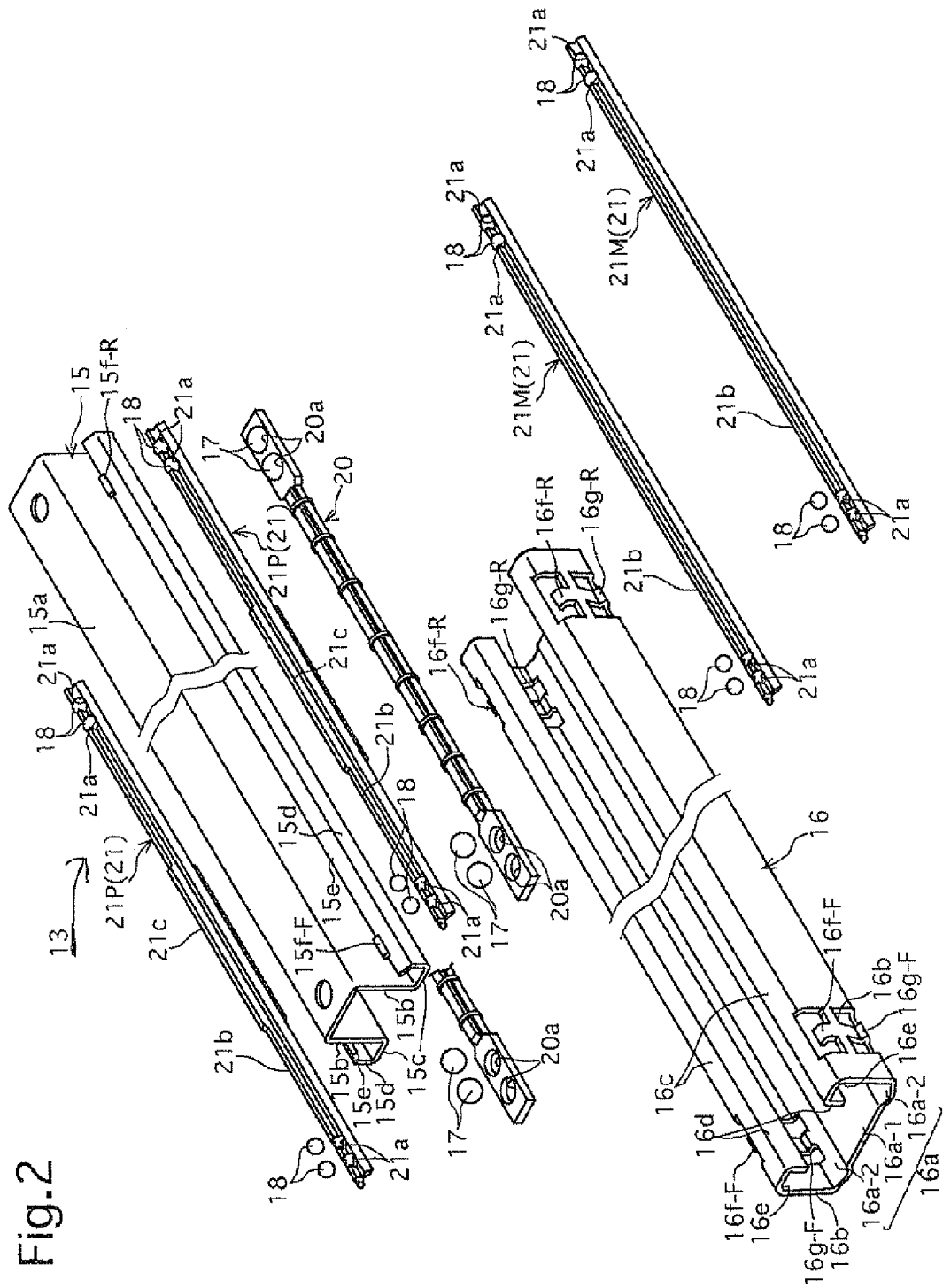
FIG. 2 is an exploded perspective view of the seat track mechanism shown in FIG. 1.

FIG. 1 shows a vehicle seat assembly 10 including a first embodiment of a seat track mechanism according to the present invention. The first embodiment of the seat track mechanism will be hereinafter discussed with reference to FIGS. 1 through 10. The vehicle seat assembly 10 is provided with a seat cushion 11 that supports buttocks of the occupant who is seated in the vehicle seat, and a seatback 12 that supports the back of the seated occupant. The vehicle seat assembly 10 is supported by a seat track mechanism 13 to be movable in the forward/rearward direction relative to a vehicle floor (floor surface) 14. The seat track mechanism 13 is provided with an upper rail 15 and a lower rail 16, so as to constitute a pair of rails which are secured to the bottom of the seat cushion 11 and the vehicle floor 14, respectively. As shown in FIG. 2, the seat track mechanism 13 is provided between the upper rail 15 and the lower rail 16 with metal balls (spherical rotators) 17 and 18. The upper rail 15 and the lower rail 16 are elongated in the forward/rearward direction of the vehicle, and the position of the seat cushion 11 in the forward/rearward direction can be adjusted by sliding the upper rail 15 relative to the lower rail 16. The upper rail 15 is provided thereon with a seatbelt anchor (L-shaped anchor plate) 31 (see FIG. 1) to which a seatbelt 30 is connected. Although only a pair of rails (the upper rail 15 and the lower rail 16) is shown in FIG. 2, the seat track mechanism 13 is provided with two pairs of rails (each of which includes the upper rail 15 and the lower rail 16) installed at different positions in the left/right direction (lateral direction) of the vehicle seat assembly 10 to extend parallel to each other.

Figure 3:
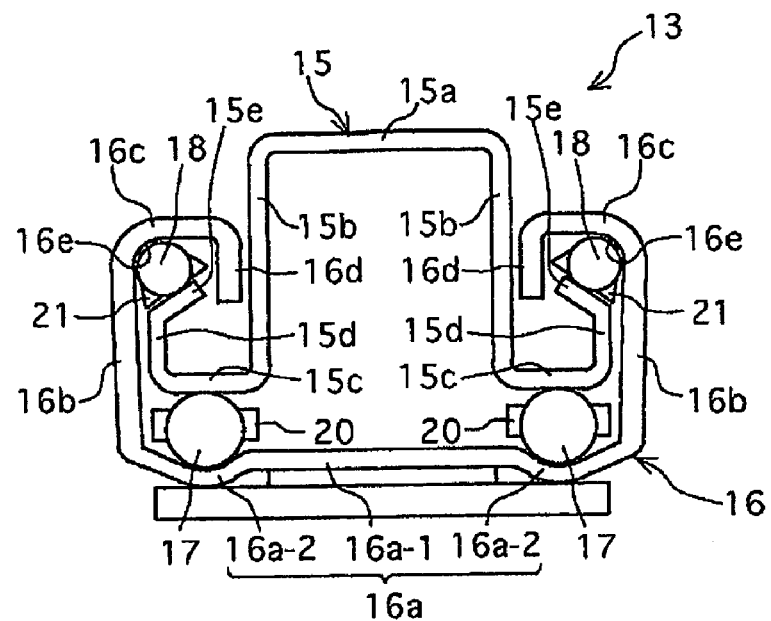
FIG. 3 is a cross sectional view of the first embodiment of the seat track mechanism, taken along a vertical plane substantially orthogonal to the sliding direction of an upper rail.
Figure 4:
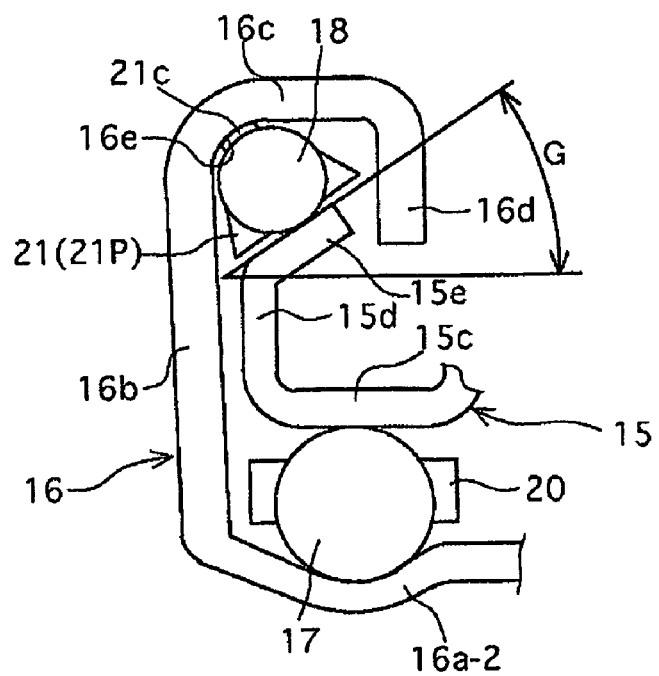
FIG. 4 is an enlarged cross sectional view of a portion of the seat track mechanism shown in FIG. 3, showing a left side of the seat track mechanism.

As shown in FIGS. 3 and 4, the lower rail 16 is provided with a bottom portion 16a, a pair of (left/right) side wall portions 16b, a pair of inward-extending flanges 16c and a pair of downward-extending flanges 16d. The bottom portion 16a faces the vehicle floor 14, the pair of side wall portions 16b extend upwardly from the lateral edges of the bottom portion 16a, the pair of inward-extending flanges 16c extend inwardly, toward a center of the upper rail 15 and the lower rail 16 in the left/right direction with respect to FIG. 3 (hereinafter referred to as a rail center), from the top edges of the side wall portions 16b, and the pair of downward-extending flanges 16d extend downwardly from the inner edges (edges closer to the rail center) of the pair of inward-extending flanges 16c.

Figure 5:
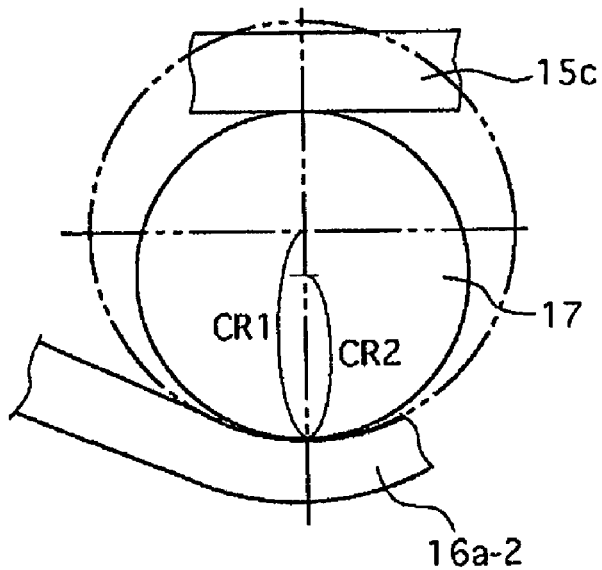
FIG. 5 is an enlarged cross sectional view of a portion of the seat track mechanism shown in FIG. 3, showing a ball holding structure for holding a ball between a first ball contacting portion of the upper rail and a ball-supporting recessed portion of the associated lower rail.

A central portion of the bottom portion 16a is formed as a horizontal flat bottom portion 16a-1. The bottom portion 16a is provided, on both sides of this central portion of the bottom portion 16a, with a pair of ball-supporting recessed portions (rotator supporting recesses) 16a-2, respectively. Each ball-supporting recessed portion 16a-2 has a circularly arcuate shape in cross section which is uniform in the lengthwise direction of the lower rail 16, and a total of four balls 17 are positioned on the arc-shaped inner peripheral surface of each ball-supporting recessed portion 16a-2 to be supported thereby. As shown in FIG. 5, a radius of curvature CR1 of the inner peripheral surface of each ball-supporting recessed portion 16a-2 is greater than a radius of curvature CR2 of the spherical surface of each ball 17, and accordingly, each ball 17 is in point contact with the inner peripheral surface of the associated ball-supporting recessed portion 16a-2 to be supported thereby at a single point thereon. In addition, the inner surface of the boundary between each side wall portion 16b and the associated inward-extending flange 16c is formed as a ball inscribing surface 16e having an arc-shaped cross section.

The upper rail 15 is provided with a top portion 15a, a pair of (left/right) vertical wall portions 15b, a pair of (left/right) first ball contacting portions (horizontal flat portions) 15c, a pair of (left/right) connecting portions 15d and a pair of (left/right) second ball contacting portions 15e. The pair of vertical wall portions 15b extend downwardly from the lateral edges of the top portion 15a, the pair of first ball contacting portions 15c extend sideways, toward the adjacent side wall portions 16b, from the bottom edges of the pair of vertical wall portions 15b, the pair of connecting portions 15d extend upwardly from the outer edges of the pair of first ball contacting portions 15c, and the pair of second ball contacting portions 15e extend obliquely upwards, toward the pair of downward-extending flanges 16d, from the top edges of the pair of connecting portions 15d. In the upper rail 15, the top portion 15a and the first ball contacting portions 15c are formed as horizontal flat portions substantially orthogonal to a load in a vertical direction (i.e., substantially parallel to the widthwise direction of the upper rail 15), and the vertical wall portions 15b and the connecting portions 15d are formed as vertical flat portions substantially orthogonal to the horizontal flat portions. Each second ball contacting portion 15e is formed as an inclined flat portion which approaches the associated vertical wall portion 15b (i.e., toward the rail center) in the upward direction from the boundary between the second ball contacting portion 15e and the associated connecting portion 15d.

As shown in FIG. 3, the upper rail 15 is installed in the lower rail 16 so that the pair of vertical wall portions 15b are positioned between the pair of downward-extending flanges 16d with the top portion 15a being orientated upwardly and so that the pair of connecting portions 15d are positioned between the pair of side wall portions 16b. In a state where the upper rail 15 and the lower rail 16 are combined, each first ball contacting portion 15c and the associated ball-supporting recessed portion 16a-2 face each other and are spaced from each other in the vertical direction, while each second ball contacting portion 15e and the associated ball inscribing surface 16e face each other and are spaced from each other in a direction substantially orthogonal to the direction of inclination of the second ball contacting portion 15e. Four balls 17 are held between each first ball contacting portion 15c and the associated ball-supporting recessed portion 16a-2 to be allowed to roll in the space therebetween, while four ball 18 are held between each second ball contacting portion 15e and the associated ball inscribing surface 16e to be allowed to roll in the space therebetween.

The balls 17 are installed in between the upper rail 15 and the lower rail 16 while being supported by resin-molded ball guides 20, and also the balls 18 are installed in between the upper rail 15 and the lower rail 16 while being supported by resin-molded ball guides 21 (21P or 21M).

As shown in FIG. 2, the ball guides 20 are provided as a pair (left and right ball guides) for each combination of the upper rail 15 and the lower rail 16, and the ball guides 20 are shaped into rods extending in the lengthwise direction of the seat track mechanism 13. Each ball guide 20 is provided at four different positions thereon in the lengthwise direction of the ball guide 20 with four ball supporting holes 20a for supporting four balls 17, respectively. Two of the four ball supporting holes 20a and the remaining two ball supporting holes 20a are formed at the opposite ends of each ball guide 20, respectively. In FIG. 2, regarding one of the two ball guides 20, only a portion of the ball guide 20 in the vicinity of one of the opposite ends thereof which includes two ball supporting holes 20a is shown.

Similar to the ball guides 20, the seat track mechanism 13 is provided with the aforementioned ball guides 21 (21P or 21M) as a pair (left and right ball guides) for each combination of the upper rail 15 and the lower rail 16, and the ball guides 21 are shaped into rods extending in the lengthwise direction of the seat track mechanism 13. Each ball guide 21 is provided at four different positions thereon in the lengthwise direction of the ball guide 21 with four ball supporting holes 21a for supporting four balls 18, respectively. Two of the four ball supporting holes 21a and the remaining two ball supporting holes 21a are formed at the opposite ends of each ball guide 21, respectively.

Each ball guide 20 is inserted into the space between one of the pair of first ball contacting portions 15c and the associated ball-supporting recessed portion 16a-2 with four balls 17 being respectively engaged in the four ball supporting holes 20a of the ball guide 20 to be supported thereby, and each ball guide 21 is inserted into the space between one of the pair of second ball contacting portions 15e and the associated ball inscribing surface 16e with four balls 18 being respectively engaged in the four ball supporting holes 21a of the ball guide 21 to be supported thereby. Each of the ball supporting holes 20a and 21a is a through hole. In a state where the ball guides 20 and 21 are inserted in the aforementioned associated spaces between the upper rail 15 and the lower rail 16, each ball 17 projects upward and downward from the associated ball supporting hole 20a of the ball guide 20 to be in contact with the associated first ball contacting portion 15c and the associated ball-supporting recessed portion 16a-2, respectively, while each ball 18 projects upward and downward from the associated ball supporting hole 21a of the ball guide 21 to be in contact with the associated second ball contacting portion 15e and the associated ball inscribing surface 16e, respectively.

Figure 10:
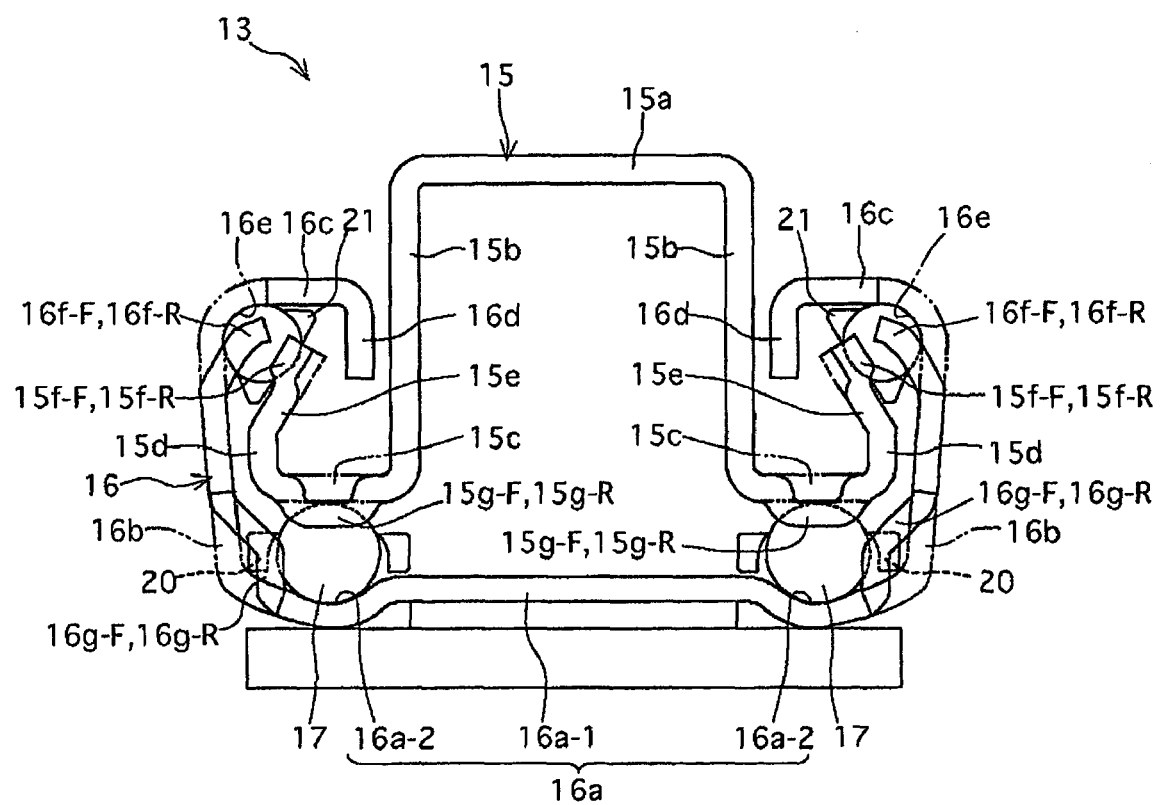
FIG. 10 is a cross sectional view of the first embodiment of the seat track mechanism, taken at the position of a ball-guide movement limit portion formed between the upper rail and the lower rail.

The seat track mechanism 13 is provided with movement limit portions for limiting the maximum amount of movement of the ball guides 20 and 21 in the sliding direction thereof. As shown in FIGS. 2 and 10, the upper rail 15 is provided, on the pair of second ball contacting portions 15e at different positions in the forward/rearward direction, with a pair of front movement limit lugs 15f-F (as forward movement limit portions for the ball guides 21) and a pair of rear movement limit lugs 15f-R (as rearward movement limit portions for the ball guides 21) in the vicinity of the front end and the rear end of the upper rail 15, respectively, and the lower rail 16 is provided on the pair of side wall portions 16b at different positions in the forward/rearward direction, with a pair of front bent lugs 16f-F (as forward movement limit portions for the ball guides 21) and a pair of rear bent lugs 16f-R (as rearward movement limit portions for the ball guides 21) in the vicinity of the front end and the rear end of the lower rail 16, respectively. As shown in FIG. 10, each movement limit lug of the front movement limit lugs 15f-F and the rear movement limit lugs 15f-R is provided in the vicinity of the upper end thereof with a protruding portion which protrudes obliquely upwards and inwards. This protruding portion of each movement limit lug 15f-F and 15f-R lies on the moving path of the associated ball guide 21. The relative positions between the movement limit lugs 15f-F and 15f-R of the upper rail 15 and the bent lugs 16f-F and 16f-R of the lower rail 16 are determined so that the movement limit lugs 15f-F and 15f-R and the bent lugs 16f-F and 16f-R do not interfere with each other when the upper rail 15 slides on the lower rail 16 via the balls 17 under normal conditions (see FIG. 10).

When the upper rail 15 is in the central position (neutral position) between the front and rear ends (opposite ends) of the moving range of the upper rail 15 with respect to the lower rail 16, the front movement limit lugs 15*f*-F are positioned behind the front bent lugs 16*f*-F to be adjacent thereto while the rear movement limit lugs 15*f*-R are positioned in front of the rear bent lugs 16*f*-R to be adjacent thereto. From this position, moving the upper rail 15 forward relative to the lower rail 16 causes the rear movement limit lugs 15*f*-R of the upper rail 15 to approach the front bent lugs 16*f*-F of the lower rail 16. The distance between the front bent lugs 16*f*-F and the rear movement limit lugs 15*f*-R in the forward/rearward direction is determined so that the ball guides 21 having moved forward with the upper rail 15 are held between the front bent lugs 16*f*-F and the rear movement limit lugs 15*f*-R with the front and rear ends of the ball guides 21 being in contact with the front bent lugs 16*f*-F and the rear movement limit lugs 15*f*-R, respectively, when the upper rail 15 moves to the front limit of movement thereof. At this time, the forward sliding movement of the ball guides 21 relative to the lower rail 16 is limited by the front bent lugs 16*f*-F and the rearward sliding movement of the ball guides 21 relative to the lower rail 16 is limited by the rear movement limit lugs 15*f*-R. Additionally, moving the upper rail 15 rearward relative to the lower rail 16 causes the front movement limit lugs 15*f*-F of the upper rail 15 to approach the rear bent lugs 16*f*-R of the lower rail 16. The distance between the front movement limit lugs 15*f*-f and the rear bent lugs 16*f*-R in the forward/rearward direction is determined so that the ball guides 21 having moved rearward with the upper rail 15 are held between the front movement limit lugs 15*f*-F and the rear bent lugs 16*f*-R with the front and rear ends of the ball guides 21 being in contact with the front movement limit lugs 15*f*-F and the rear bent lugs 16*f*-R, respectively, when the upper rail 15 moves to the rear limit of movement thereof. At this time, the forward sliding movement of the ball guides 21 relative to the lower rail 16 is limited by the front movement limit lugs 15*f*-F and the rearward sliding movement of the ball guides 21 relative to the lower rail 16 is limited by the rear bent lugs 16*f*-R.

As shown in FIG. 10, the upper rail 15 is provided, on the pair of first ball contacting portions 15*c* at different positions in the forward/rearward direction, with a pair of front movement limit projections 15*g*-F (as forward movement limit portions for the ball guides 20) and a pair of rear movement limit projections 15*g*-R (as rearward movement limit portions for the ball guides 20) in the vicinity of the front end and the rear end of the upper rail 15, respectively, and the lower rail 16 is provided at different positions in the forward/rearward direction with a pair of front inwardly bent portions 16*g*-F (as forward movement limit portions for the ball guides 20) and a pair of rear inwardly bent portions 16*g*-R (as rearward movement limit portions for the ball guides 20) in the vicinity of the front end and the rear end of the lower rail 16, respectively (see FIGS. 2 and 10). Note that the front movement limit projections 15*g*-F and the rear movement limit projections 15*g*-R do not appear in FIG. 2 and are shown only in the cross sectional view in FIG. 10. The front movement limit projections 15*g*-F and the rear movement limit projections 15*g*-R are provided separately from each other in the forward/rearward direction, just as with the front movement limit lugs 15*f*-F and the rear movement limit lugs 15*f*-R. Specifically, the front movement limit projections 15*g*-F are formed at substantially the same front positions as the front movement limit lugs 15*f*-F in the lengthwise direction of the upper rail 15, and the rear movement limit projections 15*g*-R are formed at substantially the same rear positions as the rear movement limit lugs 15*f*-R in the lengthwise direction of the upper rail 15. The front movement limit projections 15*g*-F and the rear movement limit projections 15*g*-R are formed to project downward from the first ball contacting portions 15*c* to lie on the moving paths of the ball guides 20. Additionally, as shown in FIG. 10, the front inwardly bent portions 16*g*-F and the rear inwardly bent portions 16*g*-R are formed by inwardly bending portions of the lower rail 16 at the boundaries between the side wall portions 16*b* and the bottom portion 16*a* to lie on the moving paths of the ball guides 20. The distance between the front inwardly bent portions 16*g*-F and the rear inwardly bent portions 16*g*-R in the forward/rearward direction is substantially identical to the distance between the front bent lugs 16*f*-F and the rear bent lugs 16*f*-R. The relative positions between the movement limit projections 15*g*-F and 15*g*-R of the upper rail 15 and the inwardly bent portions 16*g*-F and 16*g*-R of the lower rail 16 are determined so that the movement limit projections 15*g*-F and 15*g*-R and the inwardly bent portions 16*g*-F and 16*g*-R do not interfere with each other when the upper rail 15 slides on the lower rail 16 via the balls 17 under normal conditions (see FIG. 10).

When the upper rail 15 is in the central position (neutral position) between the front and rear ends (opposite ends) of the moving range of the upper rail 15 with respect to the lower rail 16, the front movement limit projections 15*g*-F are positioned behind the front inwardly bent portions 16*g*-F to be adjacent thereto while the rear movement limit projections 15*g*-R are positioned in front of the rear inwardly bent portions 16*g*-R to be adjacent thereto. From this state, moving the upper rail 15 forward relative to the lower rail 16 causes the rear movement limit projections 15*g*-R of the upper rail 15 to approach the front inwardly bent portions 16*g*-F of the lower rail 16. The distance between the front inwardly bent portions 16*g*-F and the rear movement limit projections 15*g*-R in the forward/rearward direction is determined so that the ball guides 20 having moved forward with the upper rail 15 are held between the front inwardly bent portions 16*g*-F and the rear movement limit projections 15*g*-R with the front and rear ends of the ball guides 20 being in contact with the front inwardly bent portions 16*g*-F and the rear movement limit projections 15*g*-R, respectively, when the upper rail 15 moves to the front limit of movement thereof. At this time, the forward sliding movement of the ball guides 20 relative to the lower rail 16 is limited by the front inwardly bent portions 16*g*-F, and the rearward sliding movement of the ball guides 20 relative to the lower rail 16 is limited by the rear movement limit projections 15*g*-R. Additionally, moving the upper rail 15 rearward relative to the lower rail 16 causes the front movement limit projections 15*g*-F of the upper rail 15 to approach the rear inwardly bent portions 16*g*-R of the lower rail 16. The distance between the front movement limit projections 15*g*-F and the rear inwardly bent portions 16*g*-R in the forward/rearward direction is determined so that the ball guides 20 having moved rearward with the upper rail 15 are held between the front movement limit projections 15*g*-F and the rear inwardly bent portions 16*g*-R with the front and rear ends of the ball guides 20 being in contact with the front movement limit projections 15*g*-F and the rear inwardly bent portions 16*g*-R, when the upper rail 15 moves to the rear limit of movement thereof. At this time, the forward sliding movement of the ball guides 20 relative to the lower rail 16 is limited by the front movement limit projections 15*g*-F, and the rearward sliding movement of the ball guides 21 relative to the lower rail 16 is limited by the rear inwardly bent portions 16*g*-R.

As shown in FIG. 2, there are previously prepared two types of ball guides: a pair of ball guides 21P each of which includes a resistance protrusion 21*c*, and a pair of ball guides 21M neither of which includes the resistance protrusion 21*c*. The pair of ball guides 21P and the pair of ball guides 21M are selectively installed as required.

Figure 6:
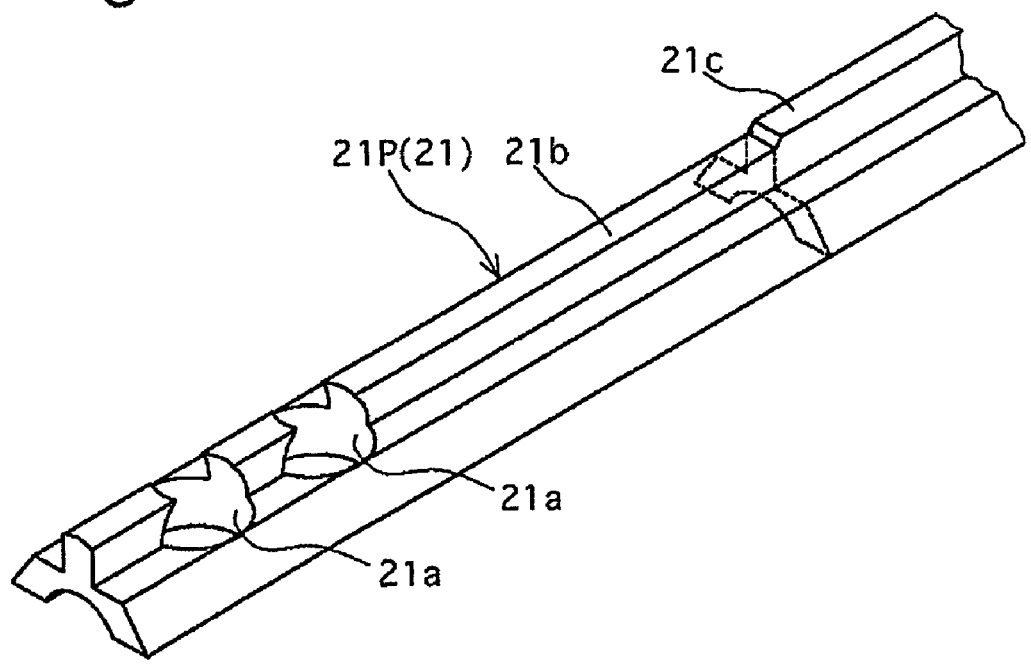
FIG. 6 is a perspective view of a portion of a type of ball guide which includes a resistance protrusion.
Figure 7:
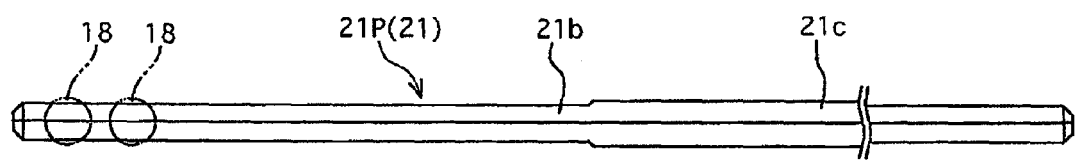
FIG. 7 is a side view, partly omitted, of the ball guide.
Figure 8:
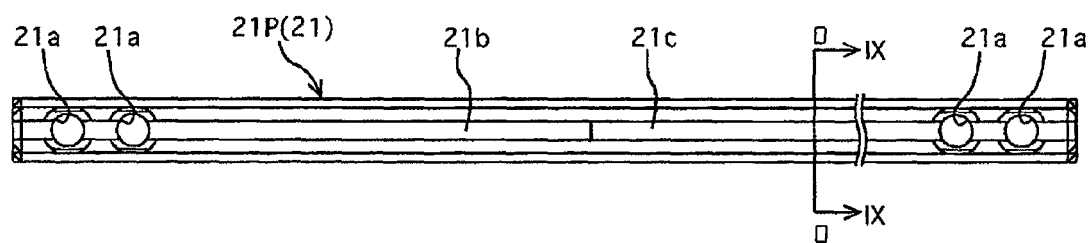
FIG. 8 is a plan view, partly omitted, of the ball guide.
Figure 9:
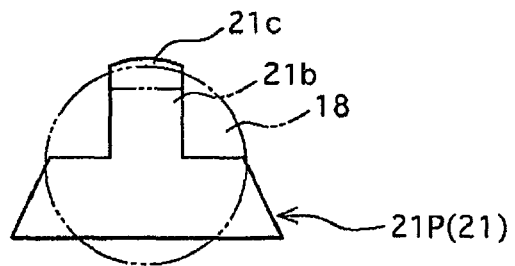
FIG. 9 is a cross sectional view taken along the IX-IX line shown in FIG. 8, viewed in the direction of the appended arrows.

As shown in FIGS. 6 through 8, each ball guide 21P is provided, on the top surface thereof that faces the associated ball inscribing surface 16e, with a rib-shaped projection 21b which projects in a direction away from the associated second ball contacting portion 15e and which is elongated along the lengthwise direction of the ball guide 21P, and each ball guide 21P is further provided, on a central portion of the top surface of the ball guide 21P in the lengthwise direction thereof, with the aforementioned resistance protrusion 21c which projects in the same direction as the associated rib-shaped projection 21b by a greater amount than the associated rib-shaped projection 21b (to be closer to the associated ball inscribing surface 16e than the associated rib-shaped projection 21b). As shown in FIGS. 4 and 9, the amount of projection of the resistance protrusion 21c is predetermined so that the top end of the resistance protrusion 21c projects slightly from the outer spherical surfaces of the associated balls 18 as viewed from the front of the associated ball guide 21 in a free state before the resistance protrusion 21c is deformed. Upon the pair of ball guides 21P being respectively inserted into the two spaces between the pair of second ball contacting portions 15e and the pair of ball inscribing surfaces 16e with four balls 18 being engaged in the four ball supporting holes 21a of each ball guide 21, the resistance protrusion 21c of each ball guide 21 is compressed and deformed between the associated contacting surface 16e and the associated second ball contacting portion 15e so that both the resistance protrusion 21c and the associated balls 18 come in contact with the associated ball inscribing surface 16e. Due to the sliding friction given by the resistance protrusion 21c thus deformed, the sliding load (resistance) increases when the upper rail 15 slides. Although only the resistance protrusion 21c appears to be in contact with the associated ball inscribing surface 16e in FIG. 4 since the resistance protrusion 21c in a free state before being compressed and deformed is shown in FIG. 4, not only the resistance protrusion 21c but also the balls 18 come in contact with the associated ball inscribing surface 16e with the resistance protrusion 21c being compressed and deformed in reality when the ball guides 21P are installed in place.

On the other hand, each ball guide 21M is provided with a rib-shaped projection 21b just as with each ball guide 21P, but is not provided with the resistance protrusion 21c that each ball guide 21P has. When the pair of ball guides 21M are respectively installed in between the pair of second ball contacting portions 15e and the pair of ball inscribing surfaces 16e with four balls 18 being engaged in the four ball supporting holes 21a of each ball guide 21, the rib-shaped projection 21b of each ball guide 21M does not come in contact with the associated ball inscribing surface 16e, so that the sliding resistance becomes smaller than that in the case of using the ball guides 21P.

It is desirable to use the pair of ball guides 21P and the pair of ball guides 21M appropriately according to the seat slide mechanism (not shown) used for sliding the upper rail 15.

Two types of seat slide mechanisms are known in the art, i.e., a power slide mechanism (motor-driven slide mechanism) and a manual slide mechanism. However, in conventional seat track mechanisms, a constant sliding resistance is not always applied to forward/rearward movements of the seat; the load on forward/rearward movements of the seat differs according to whether the seat moves forward or rearward in the case where each seat rail is inclined so that the levels of the front and rear ends of each seat rail are mutually different. In such a case, if the seat slide mechanism is a power slide type of seat slide mechanism, the motor driving sound varies by variations in load on a motor caused according to whether the seat is driven forward or rearward. To reduce variations of the motor driving sound, it is desirable that the sliding resistance of the upper rail 15 with respect to the lower rail 16 be set at a high resistance in advance so that the difference between the sliding resistance at the time the seat moves forward and the sliding resistance at the time seat moves rearward becomes small. Increasing the ball diameter and also tuning the seat rail shape itself by adjusting the amount of warping of the upper rail are known methods for increasing the sliding resistance. However, a resistance to the balls is a rolling friction, so that the friction coefficient is small, and accordingly, it is difficult to increase the sliding resistance in an effective manner simply by increasing the ball diameter. In addition, if the diameters of the balls 17 and 18 are increased excessively, there is a possibility of the heightwise position of the upper rail 150 with respect to the lower rail 160 changing. Additionally, it is time-consuming to tune the amount of warping of the upper rail (i.e., to adjust the amount of warping of the upper rail for precise functioning) that is made of metal as a relatively large member; moreover, there is a possibility of the upper rail interfering with the lower rail if the degree of tuning is inappropriate. In contrast, since the resistance protrusions 21c of each ball guide 21 that is in line (or surface) contact with the ball inscribing surface 16e of the associated lower rail 16 in an area thereon extending in the lengthwise direction of the seat track mechanism 13 exerts a sliding resistance on the ball inscribing surface 16e of the associated lower rail 16, so that the friction coefficient is large, and accordingly, the sliding resistance can be easily increased in an effective manner at little expense in time and effort.

In the case where the seat slide mechanism is a manual slide type of seat slide mechanism, variations of such a sound as the motor driving sound produced by the power slide type of seat slide mechanism do not have to be taken into account and it is undesirable for the sliding resistance to be high when the seat is manually moved, and accordingly, it is desirable for the ball guides 21M, each of which does not include the resistance protrusion 21c, to be used in the slide track mechanism 13.

Namely, an appropriate sliding resistance can be easily set simply by selecting either the two ball guides 21P or the two ball guides 21M with no need to adjust the amount of warping of the upper rails 15 or prepare various types of balls 18 having different diameters beforehand. The ball guides 21P and 21M are molded of resin, thus being easy to produce and causing less noise when in use.

Since each of all the four ball guides 20 and 21 (21P or 21M) holds four balls 17 and 18, respectively, that are aligned in the lengthwise direction of the seat track mechanism 13, the intervals between the balls in the lengthwise direction of the seat track mechanism 13 can be determined with a high degree of precision. Additionally, the pair of ball guides (left and right ball guides) 20 and the pair of ball guides (left and right ball guides) 21 (21P and 21M) are separated from each other in the widthwise direction of the seat track mechanism 13, i.e., not connected to each other in the widthwise direction of the seat track mechanism 13, and therefore do not interfere with other elements of the seat track mechanism 13 which are positioned in a central part of the seat track mechanism 13. For instance, unlike the pair of ball guides 20 in the present embodiment of the seat track mechanism 13, a ball guide which is shaped to be spread over left and right balls (which correspond to the left and right balls 17) to support these balls is known in the art. However, since this conventional type of ball guide is positioned to overlap protrusions (e.g., stop pins for limiting the amount of rail sliding amount) formed at the bottoms of the lower rails in the widthwise direction of the seat track mechanism, each seat rail (upper and lower rails) is required to secure a long length to be prevented from interfering with such protrusions. Accordingly, miniaturization of the seat track mechanism is limited by the installation of such a conventional ball guide. In contrast, this sort of interference problem does not have to be taken into account and the lengths of the upper and lower rails 15 and 16 can be cut down since the ball guides 20 and the ball guides 21 of the present embodiment of the seat track mechanism 13 are small in a frontal projected area and do not extend to a central portion between the upper rails 15 or the lower rails 16 in the widthwise direction of the seat track mechanism 13.

As described above, in the seat track mechanism 13, the upper rail 15 is supported by the lower rail 16 via the plurality of balls 17 and 18, and moving the upper rail 15 in the forward/rearward direction causes the balls 17, which are installed between the pair of first ball contacting portions 15c and the pair of ball-supporting recessed portions 16a-2, to roll therebetween and simultaneously causes the balls 18, which are installed between the pair of (left/right) second ball contacting portions 15e and the ball inscribing surfaces 16e of the lower rail 16, to roll therebetween, which makes smooth sliding movements of the upper rail 15 relative to the lower rail 16 possible.

As described above, in the present embodiment of the seat track mechanism 13, the balls 17 are supported by the arc-shaped inner peripheral surfaces of the ball-supporting recessed portions 16a-2 of the lower rail 16, and the contacting portions of the upper rail 15 which are in contact with the balls 17 are formed as the pair of first ball contacting portions 15c that serve as horizontal flat portions. This structure is superior in variation inhibitive control (stability) on the height position of the upper rail 15 with respect to the lower rail 16 (the distance from the bottom portion 16a of the lower rail 16 to the top portion 15a) and is also effective in preventing the upper rail 15 from tilting relative to the lower rail 16.

The height position of the upper rail 15 itself does not change even if the contact points between the pair of first ball contacting portions 15c and the balls 17 in the widthwise direction of the seat track mechanism 13 (the left/right direction with respect to FIG. 3) change due to variations in dimensional accuracies of components of the seat track mechanism 13, loads in the lateral direction of the seat track mechanism 13 since the contacting portions of the upper rail 15 which come in contact with the balls 17 are formed as the pair of first ball contacting portions 15c that serve as horizontal flat portions. In addition, on the lower rail 16 side, the pair of ball-supporting recessed portions 16a-2, which are positioned below the pair of first ball contacting portions 15c to face the pair of first ball contacting portions 15c, constitute support portions for supporting the balls 17. The balls 17, which receive loads from above via the pair of first ball contacting portions 15c, try to stay at specific positions on the arc-shaped inner peripheral surfaces of the pair of ball-supporting recessed portions 16a-2 in the widthwise direction of the seat track mechanism 13 (specifically, at the deepest positions in the pair of ball-supporting recessed portions 16a-2 in the widthwise direction of the seat track mechanism 13). Therefore, the positions of the balls 17 with respect to the lower rail 16 also become stable. Accordingly, neither of the positions of the balls 17 with respect to the lower rail 16 in the vertical direction nor the positions of the pair of first ball contacting portions 15c with respect to the balls 17 in the vertical direction vary easily. In other words, elements which determine the height position of the upper rail 15 with respect to the lower rail 16 are composed of the pair of first ball contacting portions 15c, which are horizontal flat portions causing no variations in the height position between the pair of first ball contacting portions 15c and the balls 17, and the pair of ball-supporting recessed portions 16a-2, which are formed to have concave inner surfaces that make the positions of the balls 17 easy to settle in position, and accordingly, the height position of the upper rail 15 with respect to the lower rail 16 can be stabilized.

In addition, the pair of first ball contacting portions 15c have the capability of preventing the upper rail 15 from tilting relative to the lower rail 16 when a tilting load which may rotate the upper rail 15 about an axis parallel to the lengthwise direction of the upper rail 15 acts on the upper rail 15. In other words, since the pair of (left and right) first ball contacting portions 15c that serve as horizontal flat portions are elongated in a direction so as to always intersect the direction in which the aforementioned tilting load acts on the upper rail 15 (i.e., intersecting the direction of a line tangent to the aforementioned axis), the pair of first ball contacting portions 15c do not slide in the widthwise direction of the seat track mechanism 13 relative to the balls 17 but press the balls 17, which are positioned below the pair of first ball contacting portions 15c, against the pair of ball-supporting recessed portions 16a-2 so as to become immovable relative to the lower rail 16 via the balls 17 when such a tilting load acts on the upper rail 15. This prevents the upper rail 15 from tilting relative to the lower rail 16.

In addition, the downward pressing load which acts on the upper rail 15 is directly transmitted to the lower rail 16 via the balls 17 with no occurrence of component force in the left/right direction of the seat track mechanism 13, so that such a downward pressing load can be securely relieved and escaped to the vehicle floor 14 side without causing a deformation of the upper rail 15 or the lower rail 16. Namely, in terms of the strength to a vertical load, it is an effective way to form the contacting portions of the upper rail 15 which come in contact with the balls 17 as the pair of first ball contacting portions 15c.

Additionally, as described above, the inner peripheral surface of each ball-supporting recessed portion 16a-2 has a radius of curvature greater than the radius of curvature of the spherical surface of each ball 17, and each ball 17 is in point contact with the inner peripheral surface of the associated ball-supporting recessed portion 16a-2 to be supported thereby at a single point thereon. This structure has an advantage also. Namely, unlike the present embodiment of the seat track mechanism, assuming that each ball 17 is supported by the associated ball-supporting recessed portion 16a-2 at a plurality of points thereon, a variation in the relative position between these points causes the amount of movement (stroke) of the upper rail 15 per rotation of the ball 17 to vary. For instance, assuming that each ball 17 is supported by the associated ball-supporting recessed portion 16a-2 at two points thereon spaced from each other in the widthwise direction of the seat track mechanism 13, the amount of movement of the upper rail 15 per rotation of the ball 17 reduces and increases as the distance between the two points increases and reduces, respectively. If such variations in the amount of movement (stroke) of the upper rail 15 arise between the balls 17, the accuracy of movement of the upper rail 15 is affected by such variations. In a large metal member such as the lower rail 16, it is difficult to exercise accuracy control so as to keep the relative positions between the contact points of the metal member relative to a plurality of balls constant at all times. In contrast, in the present embodiment of the seat track mechanism, each ball 17 and the associated first ball contacting portions 15c are in contact with each other only at one point therebetween and also each ball 17 and the associated ball-supporting recessed portion 16a-2 are in contact with each other at one point therebetween, so that each ball 17 is held between two points (upper and lower points) thereat. The point of contact of each ball 17 with the associated ball-supporting recessed portion 16a-2 tries to stay at a point farthest from the point of contact of the ball 17 with the associated first ball contacting portions 15c (i.e., at the deepest position in the associated ball-supporting recessed portion 16a-2), and accordingly, the distances between the upper points and the lower points that hold the balls 17 therebetween are uniform and substantially identical to the diameters of the balls 17, respectively. As a result, in any of the balls 17, no variation in the amount of movement of the upper rail 15 per rotation of the ball 17 occurs, so that a seat track mechanism which ensures sliding movements of the upper rail 15 relative to the lower rail 16 with a high degree of accuracy is achieved. In addition, since the dimensional accuracies of the balls 17 at the manufacturing stage vary little as compared with the dimensional accuracies of the upper rail 15 and the lower rail 16, the distance between each first ball contacting portions 15c and the associated ball-supporting recessed portion 16a-2, which is fixed by the balls 17, in the vertical direction can be determined with a high degree of precision.

Additionally, in the present embodiment of the seat track mechanism 13, the strength of the seat track mechanism 13 in the vicinity of the balls 18 has been ensured and the dimensional accuracy thereof in the vicinity of the balls 18 has been improved. As described above, each of the pair of second ball contacting portions 15e is formed as an inclined flat portion which approaches the rail center in the upward direction from the boundary between the second ball contacting portion 15e and the associated connecting portion 15d. Play between the upper rail 15 and the lower rail 16 is prevented from occurring both in the vertical direction and the left/right direction (widthwise direction of the seat track mechanism) by making the balls 18, which are in contact with the pair of second ball contacting portions 15e, contact the ball inscribing surfaces 16e of the lower rail 16, each of which is formed by the inner surface of the boundary between one of the side wall portions 16b and the associated inward-extending flange 16c. In the present embodiment of the seat track mechanism, the angle G (shown in FIG. 4) which represents the raised angle of each second ball contacting portion 15e relative to a horizontal plane is set at 32 degrees.

If the angle G is too small, the strength for holding the balls 18 between the pair of second ball contacting portions 15e and the pair of ball inscribing surfaces 16e in the left/right direction is reduced, which makes it easy to cause play between the upper rail 15 and the lower rail 16 in the left/right direction upon a load in the lateral direction being exerted on the upper rail 15. On the other hand, if the angle G is excessively large, the strength for holding the balls 18 between the pair of second ball contacting portions 15e and the pair of ball inscribing surfaces 16e in the vertical direction is reduced, which makes it easy to cause play between the upper rail 15 and the lower rail 16 in the vertical direction upon a load in a direction to pull up the upper rail 15 being exerted on the upper rail 15. To prevent such play in the left/right direction and the vertical direction from occurring around the balls 18, it is desirable that the angle G be set at an angle between 25 and 40 degrees.

Figure 16:
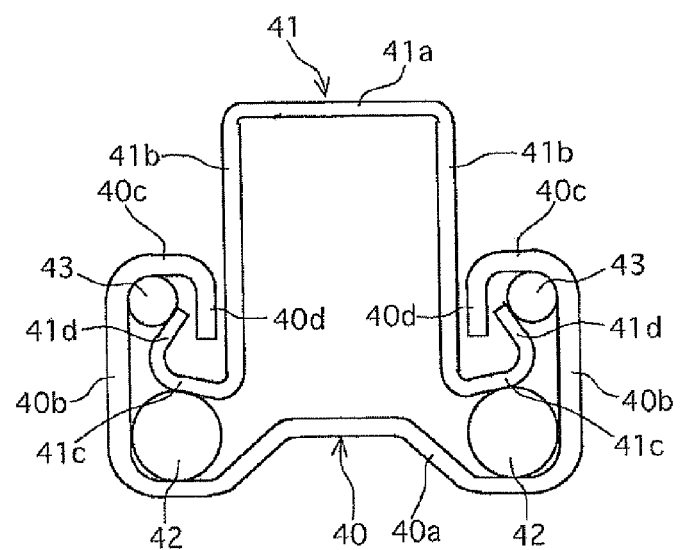
FIG. 16 is a cross sectional view of a conventional seat track mechanism, taken along a vertical plane substantially orthogonal to the sliding direction of the upper rail.

Similar to the above described upper rail 41 in prior art with reference to FIG. 16, upon a load in a direction to pull up the upper rail 15 being imposed on the upper rail 15, component forces urging the upper rail 15 and the lower rail 16 to be deformed in the left/right direction are produced via the second ball contacting portions 15e that extend obliquely. More specifically, a force urging the pair of vertical wall portions 15b to approach each other acts on the upper rail 15 while a force urging the pair of side wall portions 16b to move away from each other acts on the lower rail 16. Such component forces in the left/right direction increase in proportion to the angle G of each second ball contacting portion 15e. For instance, in the prior art shown in FIG. 16, the raised angle (which corresponds to the angle G) of each second inclined portion 41d of the upper rail 41 relative to a horizontal plane is approximately 56 degrees. The second ball contacting portions 15e, the raised angles of which are smaller than those of the second inclined portions 41d of the upper rail 41, can reduce the deforming force in the left/right direction by a greater degree than the second inclined portions 41d of the upper rail 41.

As can be understood from the foregoing, according to the first embodiment of the seat track mechanism 13, the positional deviation of the upper rail 15 relative to the lower rail 16 can be effectively prevented from occurring and the upper rail 15 can be effectively prevented from wobbling when the upper rail 15 slides relative to the lower rail 16 by a simple and compact structure.

The present invention is not limited solely to the particular embodiment described above; making various modifications to the illustrated embodiment is possible without departing from the spirit and scope of the present invention. For example, although the upper rail 15 and the lower rail 16 are provided with the pair of first ball contacting portions (horizontal flat portions) 15c and the pair of ball-supporting recessed portions (rotator supporting recesses) 16a-2, respectively, this relative position is reversible, i.e., the upper rail and the lower rail can be provided with the rotator supporting recesses and the horizontal flat portions, respectively.

Figure 11:
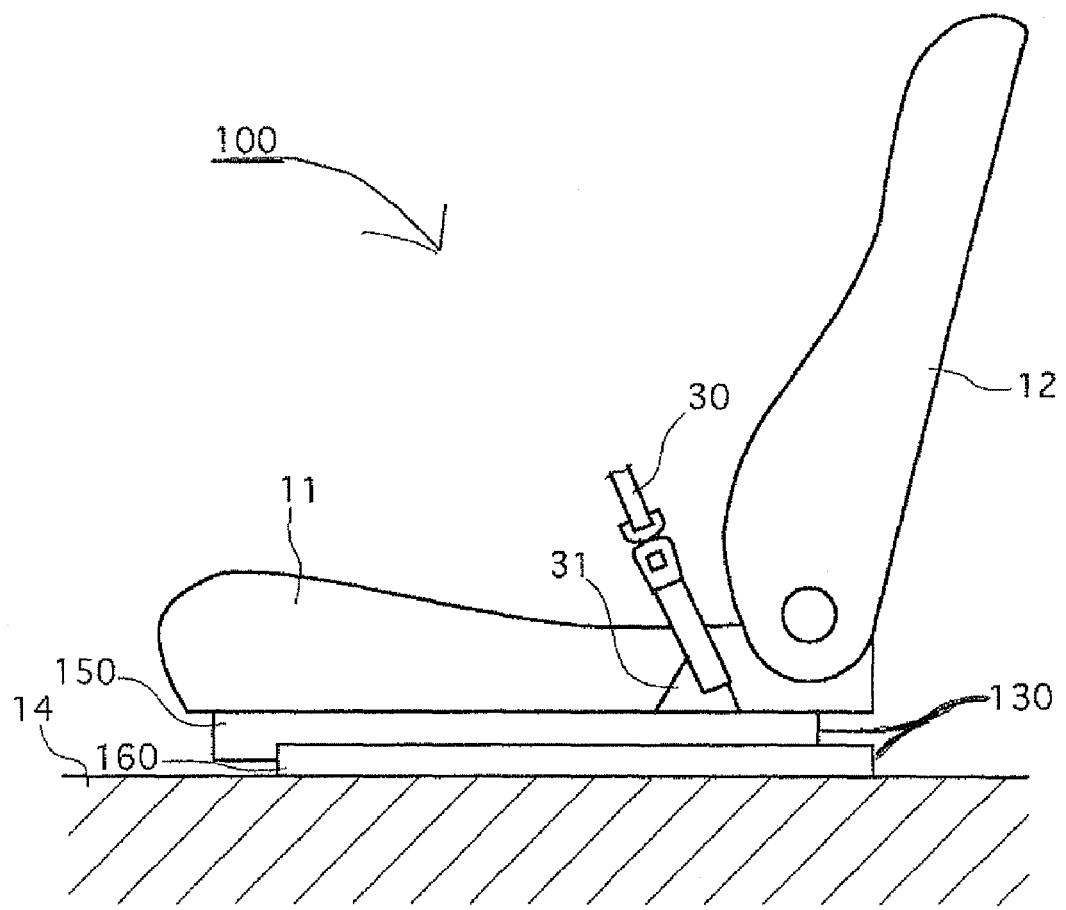
FIG. 11 is a side elevational view of a vehicle seat assembly including a second embodiment of the seat track mechanism according to the present invention.

FIG. 11 shows a vehicle seat assembly 100 including a second embodiment of the seat track mechanism according to the present invention. The second embodiment of the seat track mechanism will be hereinafter discussed with reference to FIGS. 12 through 15. Note that elements and portions of the second embodiment of the seat track mechanism which are identical to those of the first embodiment of the seat track mechanism are designated by the same reference numerals.

The vehicle seat assembly 100 shown in FIG. 11 is provided with a seat cushion 11 that supports the buttocks of an occupant who is seated in the vehicle seat, and a seatback 12 that supports the back of the seated occupant. The vehicle seat assembly 100 is supported by a seat track mechanism 130 to be movable in the forward/rearward direction relative to a vehicle floor (floor surface) 14.

Figure 12:
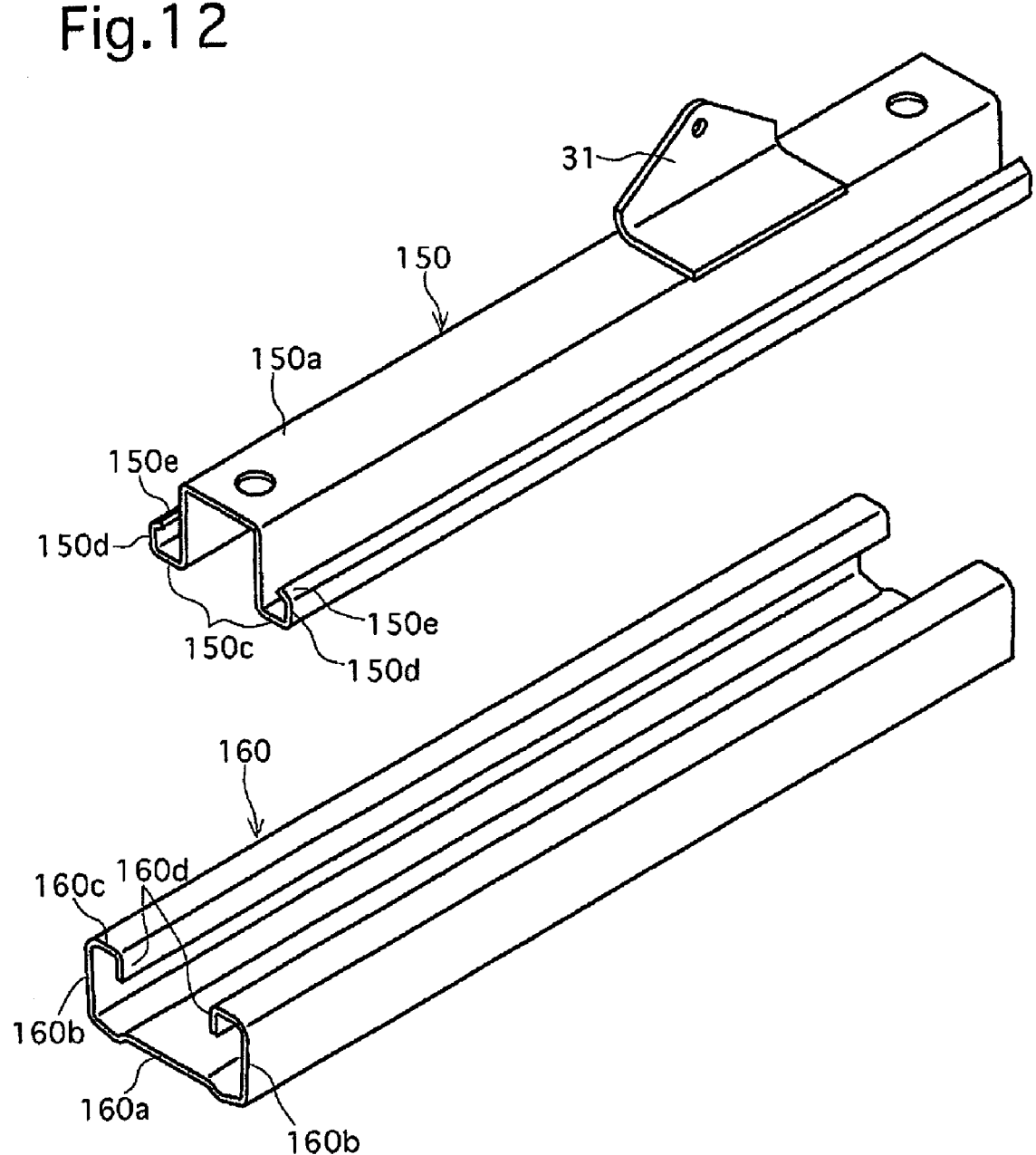
FIG. 12 is an exploded perspective view of a combination of an upper rail and a lower rail of the seat track mechanism shown in FIG. 11.
Figure 13:
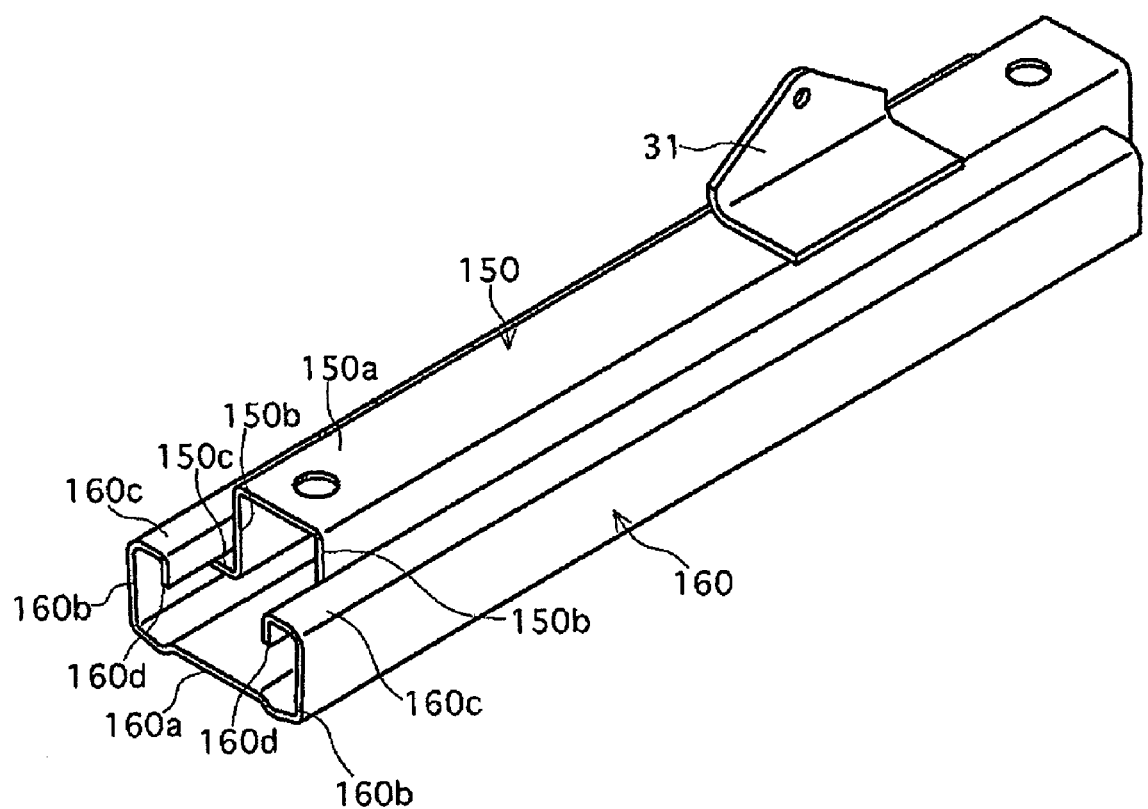
FIG. 13 is a perspective view of the upper rail and the lower rail shown in FIG. 12 in a combined state.

As shown in FIGS. 12 and 13, the seat track mechanism 130 is provided with an upper rail 150 and a lower rail 160 which are secured to the bottom of the seat cushion 11 and the vehicle floor 14, respectively. The upper rail 150 and the lower rail 160 are elongated in the forward/rearward direction of the vehicle, and the position of the seat cushion 11 in the forward/rearward direction can be adjusted by sliding the upper rail 150 relative to the lower rail 160. The seat track mechanism 130 is provided between the upper rail 150 and the lower rail 160 with a plurality of sliding guide members which ensure smooth sliding movement of the upper rail relative to the lower rail with a reduced sliding resistance therebewteen while making the lower rail 160 support the upper rail 15. Conventional spherical balls (similar to the spherical rotators (17 and 18) of the first embodiment), cylindrical rollers or resin-made slide pieces are adopted as the sliding guide members. Although only a pair of rails (the upper rail 150 and the lower rail 160) is shown in the drawings, the seat track mechanism 130 is provided with two pairs of rails (each of which includes the upper rail 150 and the lower rail 160) installed at different positions in the left/right direction (lateral direction) of the vehicle seat assembly 100 and extend parallel to each other.

Figure 14:
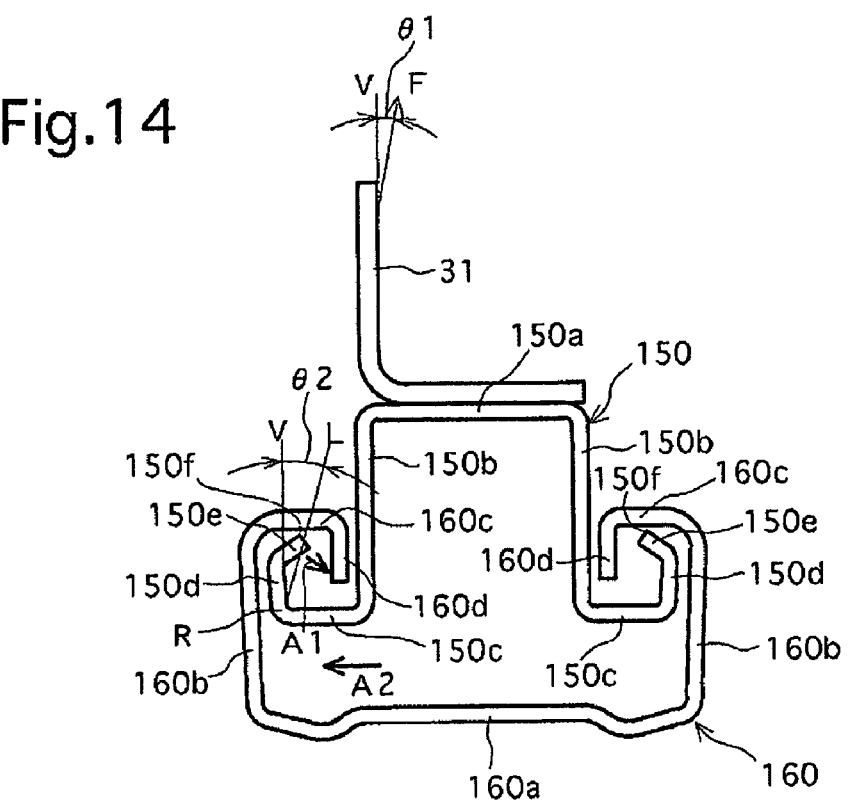
FIG. 14 is a cross sectional view of the combination of the upper rail and the lower rail shown in FIG. 13, taken along a vertical plane orthogonal to the sliding direction of the upper rail.

As shown in FIG. 14, the lower rail 160 is provided with a bottom portion 160a, a pair of (left/right) side wall portions 160b, a pair of inward-extending flanges 160c and a pair of downward-extending flanges (deformation preventive portions) 160d. The bottom portion 160a faces the vehicle floor 14, the pair of side wall portions 160b extend upwardly from the lateral edges of the bottom portion 160a, the pair of inward-extending flanges 160c extend inwardly, toward a center of the upper rail 150 and the lower rail 160 in the left/right direction with respect to FIG. 14 (hereinafter referred to as a rail center), from the top edges of the side wall portions 160b, and the pair of downward-extending flanges 160d extend downwardly from the inner edges (edges closer to the rail center) of the pair of inward-extending flanges 160c.

The upper rail 150 is provided with a top portion 150a, a pair of (left/right) first vertical wall portions 150b, a pair of (left/right) lower-end horizontal wall portions 150c, a pair of (left/right) second vertical wall portions 150d and a pair of (left/right) inclined wall portions 150e. The pair of first vertical wall portions 150b extend downwardly from the lateral edges of the top portion 150a, the pair of lower-end horizontal wall portions 150c extend sideways, toward the adjacent side wall portions 160b, from the bottom edges of the pair of first vertical wall portions 150b, the pair of second vertical wall portions 150d extend upwardly from the outer edges of the pair of lower-end horizontal wall portions 150c, and the pair of inclined wall portions 150e extend obliquely upwards, toward the pair of downward-extending flanges 160d, from the top edges of the pair of second vertical wall portions 150d. In the upper rail 150, the top portion 150a and the lower-end horizontal wall portions 150c are formed as horizontal flat portions, and the first vertical wall portions 150b and the second vertical wall portions 150d are formed as vertical flat portions substantially orthogonal to the horizontal flat portions. Each inclined wall portion 150e is formed as an inclined flat portion which approaches the associated first vertical wall portion 150b (i.e., toward the rail center) in the upward direction from the boundary between the inclined wall portion 150e and the associated second vertical wall portion 150d.

As shown in FIG. 14, the upper rail 150 is installed into the lower rail 160 so that the pair of first vertical wall portions 150b are positioned between the pair of downward-extending flanges 160d with the top portion 150a being orientated upwardly and so that the pair of second vertical wall portions 150d are positioned between the pair of side wall portions 160b. In a state where the upper rail 150 and the lower rail 160 are combined, the pair of inclined wall portions 150e are positioned below the pair of inward-extending flanges 160c, and the upper end (free end) 150f of each inclined wall portion 150e comes into contact with the associated inward-extending flange 160c to thereby prevent the upper rail 150 from being detached from the lower rail 160 when a load in a direction to pull up the upper rail 150 is imposed on the upper rail 150. Namely, in the upper rail 150, the top portion 150a, which is positioned at the widthwise center of the upper rail 150, and the pair of first vertical wall portions 150b constitute a central portion of the upper rail 150 having an inverted U-shaped cross section; in addition, the pair of lower-end horizontal wall portions 150c, the pair of second vertical wall portions 150d and the pair of inclined wall portions 150e, which are positioned on both sides of this central portion of the upper rail 150, respectively, constitute a pair of anti-detaching flanges (anti-detaching portions) which are positioned below the pair of inward-extending flanges 160c to be prevented from moving upward beyond the pair of inward-extending flanges 160c, respectively.

A seatbelt anchor (L-shaped anchor plate) 31 to which a seatbelt 30 is connected is fixed to the top portion 150a of the upper rail 150. As shown in FIG. 14, the seatbelt anchor 31 has an L-shaped cross section and is provided with a base portion which is fixed to the top portion 150a of the upper rail 150, and an upright portion which projects upward from the base portion. The arrow F shown in FIG. 14 designates the direction of a load which acts on the seatbelt anchor 31 upon the seatbelt 30 being pulled. Due to the structure of the vehicle seat assembly 100, which is structured so that the seatbelt 30 is pulled obliquely upwards relative to the upper rail 150, the direction of the arrow F is inclined toward the center of the widthwise direction (horizontal direction) of the upper rail 150 with respect to a vertical direction V by an angle $\theta1$ (see FIG. 14).

Each of the pair of inclined wall portions 150e of the upper rail 150 is inclined to approach the adjacent first vertical wall portion 150b in the upward direction from the boundary between the inclined wall portion 150e and the associated second vertical wall portion 150d. The upper end 150f of each inclined wall portion 150e is positioned closer to the widthwise center of the upper rail 150 than the boundary R between the associated lower-end horizontal wall portion 150c and the associated second vertical wall portion 150d. If the angle of inclination of a line L connecting the boundary R with the upper end 150f of the associated inclined wall portion 150e relative to the vertical direction V (angle of inclination of the line L toward the horizontal direction) is defined as an angle $\theta2$, the angle $\theta2$ is determined so that the relationship between the angle $\theta2$ and the angle $\theta1$ of the obliquely upward direction of the arrow F satisfies the following condition: $\theta2>\theta1$. By designing the aforementioned anti-detaching portions of the upper rail 150 to satisfy this condition, an effect which will be discussed hereinafter is obtained.

The load in the direction of the arrow F which is imposed on the seatbelt anchor 31 is a load urging the seatbelt anchor 31 to be detached from the top portion 150a of the upper rail 150, and therefore, the upper rail 150 is pulled upwards according to this load. However, the upper rail 150 is prevented from moving upward by engagements of the pair of inclined wall portions 150e with the pair of inward-extending flanges 160c. If the angle of inclination $\theta2$ at the anti-detaching portion of the upper rail 150 which is closer to the upright portion of the seatbelt anchor 31 (i.e., the left anti-detaching portion with respect to FIG. 14) and the angle $\theta1$ of the obliquely upward direction of the arrow F satisfy the aforementioned condition "$\theta2>\theta1$", the inclined wall portion 150e and the second vertical wall portion 150d which are closer to the upright portion of the seatbelt anchor 31 (i.e., the left inclined wall portion 150e and the left second vertical wall portion 150d with respect to FIG. 14) are acted upon by a component force urging the left inclined wall portion 150e and the left second vertical wall portion 150d to tilt (rotate) in a direction toward the rail center (represented by the arrow A1 shown in FIG. 14) about an axis of rotation in the vicinity of the boundary R. This axis of rotation is substantially parallel to the lengthwise direction of the upper rail 150. A force in the direction of the arrow A2 shown in FIG. 14 which urges the left lower-end horizontal wall portion 150c and the left second vertical wall portion 150d to open outwards (leftwards with respect to FIG. 14) acts on a portion of the upper rail 150 in the vicinity of the boundary R (i.e., in the vicinity of the aforementioned axis of rotation) as a reaction force against the component force in the direction of the arrow A1. Accordingly, a component force urging the central portion of the upper rail 150 to widen the width thereof is applied to the central portion of the upper rail 150. This prevents the upper rail 150 from being deformed in directions to make the central portion of the upper rail 150 become narrower to bring the pair of first vertical wall portions 150b closer to each other. Accordingly, a sufficient strength of the upper rail 150 can be ensured with no need to provide the upper rail 150 with a reinforcing member or the like between the pair of first vertical wall portions 150b. It should be noted that the upper rail 150 is prevented from being largely deformed to a degree that the sliding performance of the upper rail 150 may be impaired because each downward-extending flange 160d prevents the associated first vertical wall portion 150b from being deformed outwardly (in the direction of the arrow A2 in the case of the left first vertical wall portion 150b with respect to FIG. 14).

Figure 15:
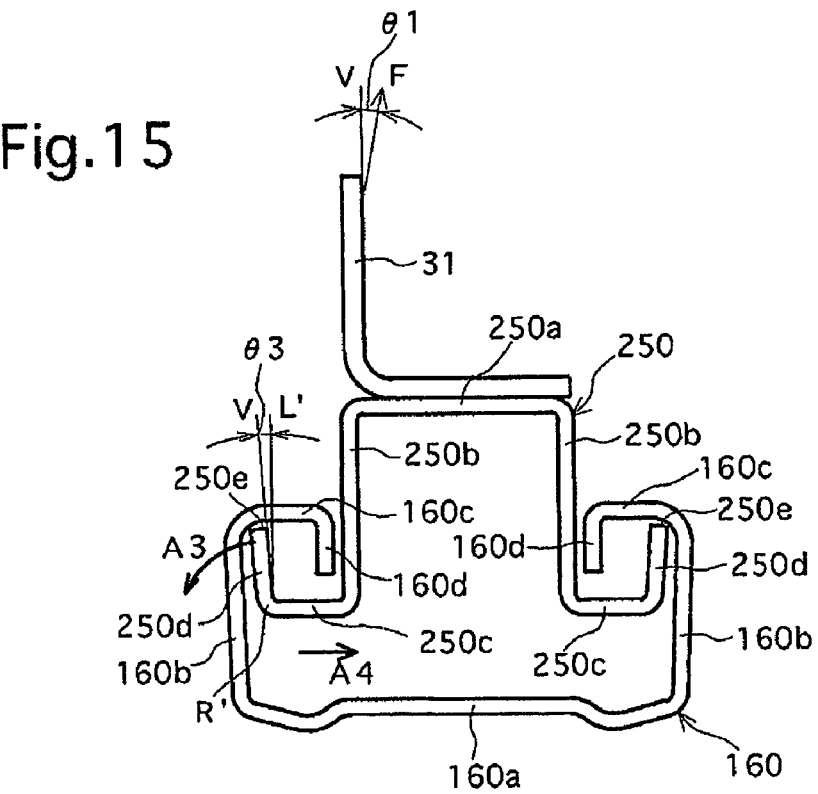
FIG. 15 is a cross sectional view of a comparative example of a combination of an upper rail and a lower rail which is to be compared with the second embodiment of the seat track mechanism.

FIG. 15 shows a comparative example of a combination of an upper rail 250 and the lower rail 160 which is to be compared with the combination of the upper rail 150 and the lower rail 160. In this comparative example, the lower rail 160 and the seatbelt anchor 31 are identical in structure to those of the second embodiment of the seat track mechanism 130, and the upper rail 250 is different in shape from the upper rail 150 of the second embodiment of the seat track mechanism 130.

The upper rail 250 is provided with a top portion 250a, a pair of first vertical wall portions 250b, a pair of lower-end horizontal wall portions 250c and a pair of second vertical wall portions 250d. The pair of first vertical wall portions 250b extend downwardly from the lateral edges of the top portion 250a, the pair of lower-end horizontal wall portions 250c extend sideways from the pair of first vertical wall portions 250b, and the pair of second vertical wall portions 250d extend obliquely upwards from the pair of lower-end horizontal wall portions 250c. Although the top portion 250a, the pair of first vertical wall portions 250b and the pair of lower-end horizontal wall portions 250c are identical in structure to the top portion 150a, the pair of first vertical wall portions 150b and the pair of lower-end horizontal wall portions 150c of the above described second embodiment of the seat track mechanism 130, the pair of second vertical wall portions 250d are different in shape from the pair of second vertical wall portions 150d of the above described second embodiment of the seat track mechanism 130. Each second vertical wall portions 250d tilts outwardly and upwardly, in a direction away from the widthwise center of the upper rail 250 (from the adjacent first vertical wall portion 250b). If the angle of inclination of a line L' connecting the boundary R' between the left lower-end horizontal wall portion 250c with respect to FIG. 15 and the upper end (free end) 250e of the associated second vertical wall portion 250d relative to the vertical direction V is defined as an angle θ3, the condition "θ3<θ1" is satisfied. According to this structure, upon the upper end 250e of the left second vertical wall portion 250d abutting against the adjacent inward-extending flanges 160c of the lower rail 160 when a load in the direction of the arrow F is imposed on the upper rail 250, a force in the direction of the arrow A3 shown in FIG. 15 which urges the left second vertical wall portion 250d to tilt outwardly (leftwardly with respect to FIG. 15) about an axis of rotation in the vicinity of the boundary R' acts on the left second vertical wall portion 250d. Thereupon, a force in the direction of the arrow A4 shown in FIG. 15 which urges the left first vertical wall portions 250b to be warped toward the widthwise center of the upper rail 250, thus causing the upper rail 250 to be deformed in directions to bring the pair of first vertical wall portions 250b closer to each other (to reduce the spacing between the pair of first vertical wall portions 250b). Once the width of the central portion of the upper rail 25 becomes narrow by this sort of deformation, a required strength of the upper rail 250 cannot be ensured, so that it becomes necessary to take such measures as installing a reinforcing member or the like between the pair of first vertical wall portions 250b of the seatbelt anchor-bearing upper rail 250 to prevent this upper rail from being deformed.

In contrast, according to structure shown in FIG. 14, no component force urging the upper rail 150 from being deformed in directions to make the central portion of the upper rail 150 become narrower is produced, so that a required strength of the upper rail 250 is ensured.

As can be understood from the foregoing, according to the above described second embodiment of the seat track mechanism, when a load in an upward direction slightly inclined to the vertical direction is imposed on the upper rail 150, the strength of the upper rail 150 and the sliding performance thereof are not impaired because the seat track mechanism 130 is provided with the above described anti-detaching portions that are designed so that a force in a direction to bring the pair of first vertical wall portions 150b closer to each other is not produced.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A seat track mechanism capable of mounting to a vehicle, comprising:
    a lower rail mountable to a vehicle floor;
    an upper rail supported by said lower rail to be slidable relative to said lower rail; and
    upper and lower spherical rotators held between said lower rail and said upper rail, wherein said spherical rotators roll according to a sliding movement of said upper rail, and wherein the upper and lower spherical rotators have different diameters,
    wherein one of said upper rail and said lower rail includes at least one horizontal flat portion substantially parallel to a widthwise direction of said seat track mechanism and substantially parallel to a direction of said sliding movement of said upper rail,
    wherein the other of said upper rail and said lower rail includes at least one rotator supporting recess having a circularly arcuate shape in cross section which is uniform in a lengthwise direction of said seat track mechanism, at least one of said spherical rotators being held between said rotator supporting recess and said horizontal flat portion,
    wherein said horizontal flat portion extends substantially parallel to said widthwise direction at both sides of said at least one spherical rotator from a point of contact between said horizontal flat portion and said at least one spherical rotator,
    wherein said rotator supporting recess is formed at a base of said lower rail, and
    wherein said horizontal flat portion is formed on said upper rail.

2. The seat track mechanism according to claim 1, wherein a radius of curvature of a circularly-arcuate inner peripheral surface of said rotator supporting recess is greater than a radius of curvature of said spherical rotators.

3. The seat track mechanism according to claim 1, wherein a pair of said horizontal flat portions are provided at different positions in a widthwise direction of said upper rail, and
wherein a pair of said rotator supporting recesses are provided at corresponding different positions in a widthwise direction of said lower rail.

4. The seat track mechanism according to claim 1, wherein each of said spherical rotators comprises a metal ball.

5. The seat track mechanism according to claim 1, wherein said rotator supporting recess is recessed in a direction away from said horizontal flat portion.

6. The seat track mechanism according to claim 1, wherein said rotator supporting recess and said horizontal flat portion face each other in a vertical direction of said seat track mechanism.

7. The seat track mechanism according to claim 1, further comprising at least one guide rod for supporting said spherical rotators which is installed between said rotator supporting recess and said horizontal flat portion, said guide rod extending parallel to both said upper rail and said lower rail,
wherein said guide rod includes through holes in which said spherical rotators are engaged, respectively, so that relative positions between said spherical rotators in said direction of said sliding movement of said upper rail are maintained constant.

8. The seat track mechanism for vehicle according to claim 1, wherein said upper rail comprises:
a central portion having an inverted U-shaped cross section; and
two anti-detaching portions which are formed on opposite sides of said central portion in a widthwise direction thereof to prevent said upper rail from being detached from said lower rail,
wherein said two anti-detaching portions apply a component force on said central portion so as to urge said central portion to increase a width thereof by abutting against two flanges formed on said lower rail, respectively, when a pulling load in a direction obliquely upward and lateral is imposed on said upper rail.

9. The seat track mechanism according to claim 8, wherein each said two anti-detaching portions produces a component force urging a free end thereof that abuts against associated one of said two flanges to tilt toward a widthwise center of said upper rail about an axis substantially parallel to a lengthwise direction of said upper rail when said pulling load is imposed on said upper rail.

10. The seat track mechanism according to claim 9, wherein said free end of each anti-detaching portion of said upper rail is positioned closer to said central portion of said upper rail than said axis, and
wherein an angle of a line connecting said free end of each anti-detaching portion with said axis relative to a vertical direction is greater than an angle of said direction of said pulling load.

11. The seat track mechanism according to claim 8, wherein said lower rail comprises two deformation preventive portions which are positioned adjacent to said opposite sides of said central portion of said upper rail to prevent said width of said central portion of said upper rail from increasing.

12. The seat track mechanism according to claim 8, wherein said two anti-detaching portions of said upper rail are provided as a pair which are respectively positioned on opposite sides of said central portion of said upper rail in said widthwise direction thereof to be substantially bisymmetrical to each other.

13. The seat track mechanism according to claim 8, wherein said central portion and said two anti-detaching portions of said upper rail are formed to have an Ω-shaped cross section taken along a plane orthogonal to a direction of sliding movement of said upper rail relative to said lower rail.

14. The seat track mechanism according to claim 1, wherein the upper spherical rotators have a smaller diameter than the lower spherical rotators.

15. A seat track mechanism capable of mounting to a vehicle, comprising:
a lower rail mountable to a vehicle floor;
an upper rail supported by said lower rail to be slidable relative to said lower rail; and
upper and lower spherical rotators held between said lower rail and said upper rail, wherein said, spherical rotators roll according to a sliding movement of said upper rail, and wherein the upper and lower spherical rotators have different diameters,
wherein one of said upper rail and said lower rail includes at least one horizontal flat portion positioned between said upper and said lower spherical rotators and wherein the horizontal flat portion is substantially parallel to a widthwise direction of said seat track mechanism and substantially parallel to a direction of said sliding movement of said upper rail, and
wherein the other of said upper rail and said lower rail includes at least one rotator supporting recess having a circularly arcuate shape in cross section which is uniform in a lengthwise direction of said seat track mechanism, at least one of said spherical rotators being held between said rotator supporting recess and said horizontal flat portion.

16. A seat track mechanism capable of mounting to a vehicle, comprising:
a lower rail mountable to a vehicle floor;
an upper rail supported by said lower rail to be slidable relative to said lower rail; and
upper and lower spherical rotators held between said lower rail and said upper rail, wherein said spherical rotators roll according to a sliding movement of said upper rail, and wherein the upper and lower spherical rotators have different diameters,
wherein one of said upper rail and said lower rail includes at least one horizontal flat portion substantially parallel to a widthwise direction of said seat track mechanism and substantially parallel to a direction of said sliding movement of said upper rail, and wherein the other of said upper rail and said lower rail includes at least one rotator supporting recess having a circularly arcuate shape in cross section which is uniform in a lengthwise direction of said seat track mechanism and wherein the lower spherical rotator is held between said rotator supporting recess and the horizontal flat portion.

* * * * *